(12) United States Patent
Xia

(10) Patent No.: US 6,850,976 B1
(45) Date of Patent: Feb. 1, 2005

(54) IP ROUTER WITH HIERARCHICAL USER INTERFACE

(75) Inventor: Jay X. Xia, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,534

(22) Filed: Mar. 31, 2000

(51) Int. Cl.$^7$ .............................................. G06F 15/173
(52) U.S. Cl. ..................... 709/224; 709/230; 709/238
(58) Field of Search ................................ 709/223, 224, 709/230, 238, 220, 243; 345/734, 735, 736

(56) References Cited

U.S. PATENT DOCUMENTS

| | | | | |
|---|---|---|---|---|
| 5,101,451 A | * | 3/1992 | Ash et al. ............... | 379/221.07 |
| 5,509,123 A | * | 4/1996 | Dobbins et al. ............ | 709/243 |
| 5,848,243 A | * | 12/1998 | Kulkarni et al. ............ | 709/224 |
| 6,046,742 A | * | 4/2000 | Chari ......................... | 345/734 |
| 6,212,558 B1 | * | 4/2001 | Antur et al. ................ | 709/221 |
| 6,269,398 B1 | * | 7/2001 | Leong et al. ............... | 709/224 |
| 6,286,038 B1 | * | 9/2001 | Reichmeyer et al. ........ | 709/220 |
| 6,295,275 B1 | * | 9/2001 | Croslin ...................... | 370/216 |
| 6,347,078 B1 | * | 2/2002 | Narvaez-Guarnieri et al. ... | 370/230 |
| 6,393,486 B1 | * | 5/2002 | Pelavin et al. .............. | 709/238 |
| 6,405,365 B1 | * | 6/2002 | Lee ........................... | 717/106 |
| 6,438,591 B1 | * | 8/2002 | Fehskens et al. ........... | 709/223 |
| 6,704,752 B1 | * | 3/2004 | Kathail et al. .............. | 707/202 |

\* cited by examiner

*Primary Examiner*—David Wiley
*Assistant Examiner*—Phuoc Nguyen
(74) *Attorney, Agent, or Firm*—Pillsbury Winthrop LLP

(57) ABSTRACT

A hierarchical interface component of a router transforms the flat feature presentation of traditional routers into a hierarchical feature presentation. The features are organized as functional components that include sub-components and attributes. Attributes store values relating to routing algorithms and components represent functionality relating to a routing algorithm and may contain additional components (sub-components) or attributes. The hierarchical interface allows a user to easily inspect, modify, and read the router attributes. Further, because the interdependencies of the attributes are clearly and visually displayed to the user, the user may more quickly understand the ramifications of changing a particular router attribute.

30 Claims, 4 Drawing Sheets

/router> add ospf —401
/router> ospf —402
/router/ospf> set preference 50 —403
/router/ospf> add area[0.0.0.3] —404
/router/ospf> add area[0.0.0.3]/if[10.1.1.1] —405
/router/ospf> display area[*]/if[*] —406

Fig. 4

IP ROUTER WITH HIERARCHICAL USER INTERFACE

BACKGROUND OF THE INVENTION

1. Field of the Invention

This application relates generally to computer networks, and more particularly, to data routing and switching in a computer network.

2. Description of Related Art

Computer networks are important, if not essential, elements of modern society. The Internet, for example, connects millions of computer users located around the world. Information is transmitted across the Internet using the well known IP protocol.

Data transmitted with the IP protocol is transmitted in discrete bundles, called packets, of data. Each packet includes an address describing the final destination of the packet. During transmission, the packets are forwarded through the network via a series of interconnected nodes. At each node, a data forwarding algorithm determines the next node that is to relay the packet. In this manner, the packets "hop" from node to node in the network until the packet reaches its final destination.

Routing protocols and their associated routing algorithms can discover and manage the data paths from the router to destination nodes. Different routing protocols can work together to discover the best paths.

One known software package that performs a number of routing protocols is known as GateD. GateD, which is available from the Merit GateDaemon Consortium, of Michigan (reachable on the world wide web at "www.gated.org"), is a software package of IP routing protocols that was initially developed for UNIX-based workstations. With GateD running, a workstation may function as a network router. GateD has also been imported into dedicated hardware routers.

Configuring or modifying the routing algorithms implemented by GateD is performed using a GateD script file. When GateD first executes, it reads its associated script file to obtain its configuration information. If a user desires to modify GateD's configuration information, the user rewrites the script file and then restarts GateD with the new script file.

Changing the configuration information by restarting GateD with a new script file is awkward when GateD is implemented as a dedicated hardware router. Interruption of data delivery service due to minor configuration changes is not generally acceptable in the real-time router environment. Dedicated routers typically operate in real-time, and thus use a real-time operating system. Real-time operating systems are usually event-driven, which means they perform tasks based on the occurrence of an event (e.g., receipt of packets). Further, they tend to lack a disk based file system and instead rely on fast access semiconductor memory. Reconfiguring GateD by closing and restarting it detracts from the real-time nature of the router and may thus undesirably hamper packet delivery.

Router configuration options may be used to set router features such as the routing algorithms to use. Conventionally, the configurable features in a router have the same functional priority (i.e., their organizational structure is "flat") and are interdependent, so that changing one option may impact the effect of other options. The flat nature of this organizational structure, however, can make it difficult for the user to understand how changing one feature may affect other features.

Accordingly, there is a need in the art to improve the ease with which a user may configure options for a router operating in real-time.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings:

FIG. 4 is a diagram illustrating an exemplary set of command-line interface commands.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

As described herein, router configuration information (i.e., attributes) is arranged in a hierarchical structure based on factors such as the feature, functionality, or interdependence of the features. Branches in the hierarchical tree structure visually and intuitively inform the user of the relationship between attributes and what attributes are affected when another attribute is modified. Accordingly, when modifying an attribute in the disclosed hierarchical structure, the user can quickly asses the routing function the attribute relates to and the attribute's relationship to other attributes. In other words, the attribute dependency is localized by the tree structure. Moreover, the user can modify the attributes on the fly without having to restart or reinitialize the router.

Figure 1:
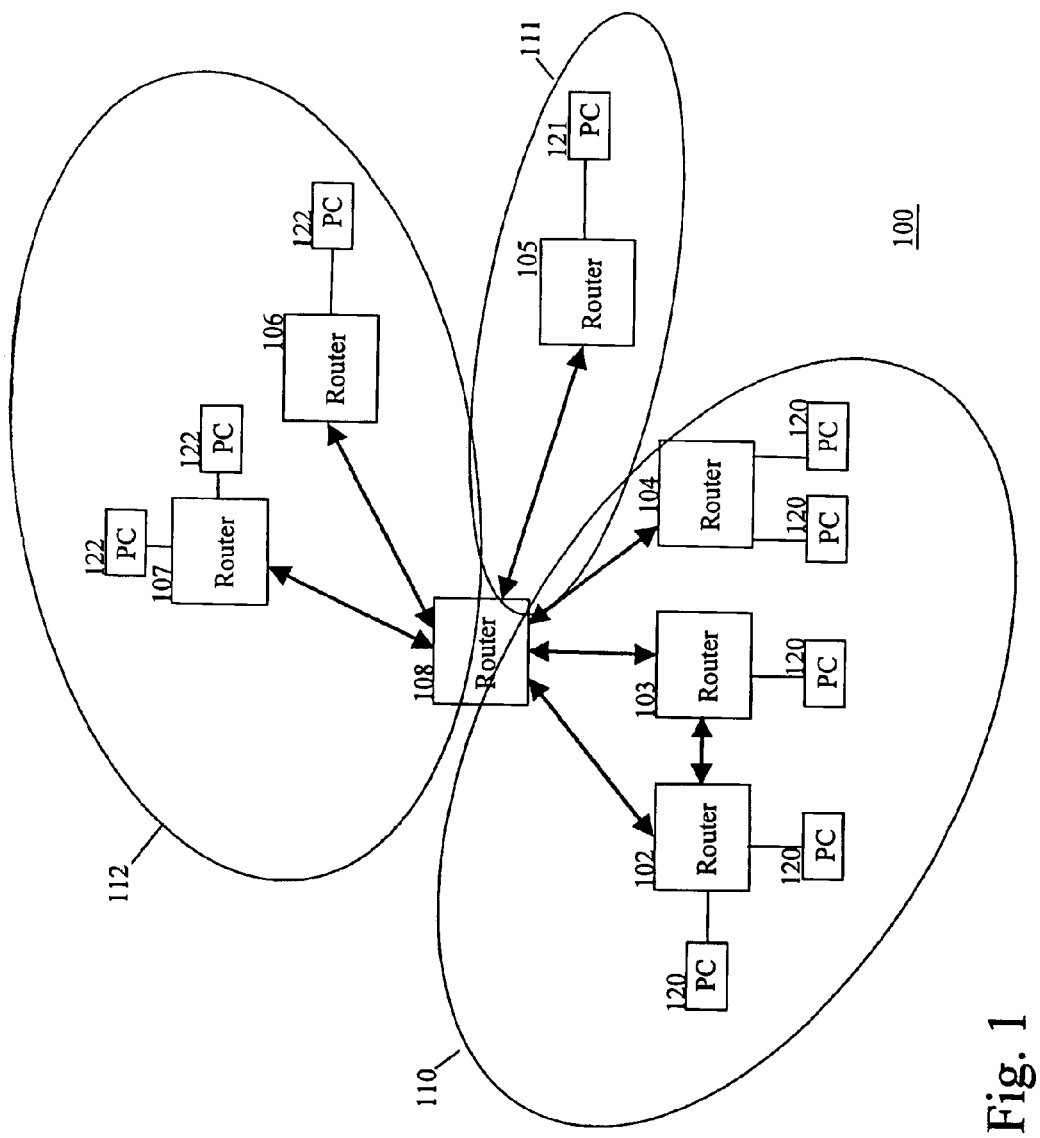
FIG. 1 is a diagram illustrating an exemplary network having routers connecting computers to form a network.

FIG. 1 is a diagram illustrating an exemplary network having routers 102–108 connecting computers to form a network 100. As shown, the network is logically subdivided into three sub-networks labeled 110, 111, and 112. Sub-network 110 includes routers 102–104 and computers 120; sub-network 111 includes router 105 and computer 121; sub-network 112 includes routers 106–107 and computers 122. Router 108 is a border router in the logical division, and thus is a member of sub-networks 110, 111 and 112. In the OSPF (Open Shortest Path First) routing protocol, which is a protocol used for discovering paths to the destination networks, this logical division is called the OSPF area.

Routers within each area 110, 111, or 112 periodically exchange network information with other routers in their area. For example, routers 102–104 each know the address of the other routers 102–104 in area 110. Thus, when one of routers 102–104 receives a packet addressed to any of computers 120, the router is aware of the complete path to the destination computer. On the other hand, border router 108 exchanges the network information between areas. When a packet is received at a router that is addressed to a computer in another area, the router, although it may not know the complete path to the packet's destination address, is able to transmit the packet to the border router to relay the packet to its destination. For example, router 108 can forward the packets from PC 120 to PC 121.

Routers 102–108 may be, for example, dedicated hardware routers, or general purpose computers running routing software such as GateD. Computers 120–122 may be any of a number of well known computer systems, such as personal computers.

For a router to function effectively in a network, it must be configured correctly. Users configuring a router typically have multiple different configurable features to choose from, such as the routing protocol(s) to support and the features associated with each protocol. Often, changing one attribute of a router may affect a number of other attributes.

Consistent with an aspect of the present invention, router attributes (i.e., configurable features) are arranged hierarchically by functionality or dependency. "Components" are defined that hold groups of related attributes. This hierarchical component tree allows a user to easily inspect, modify, and read the router attributes.

Figure 2:
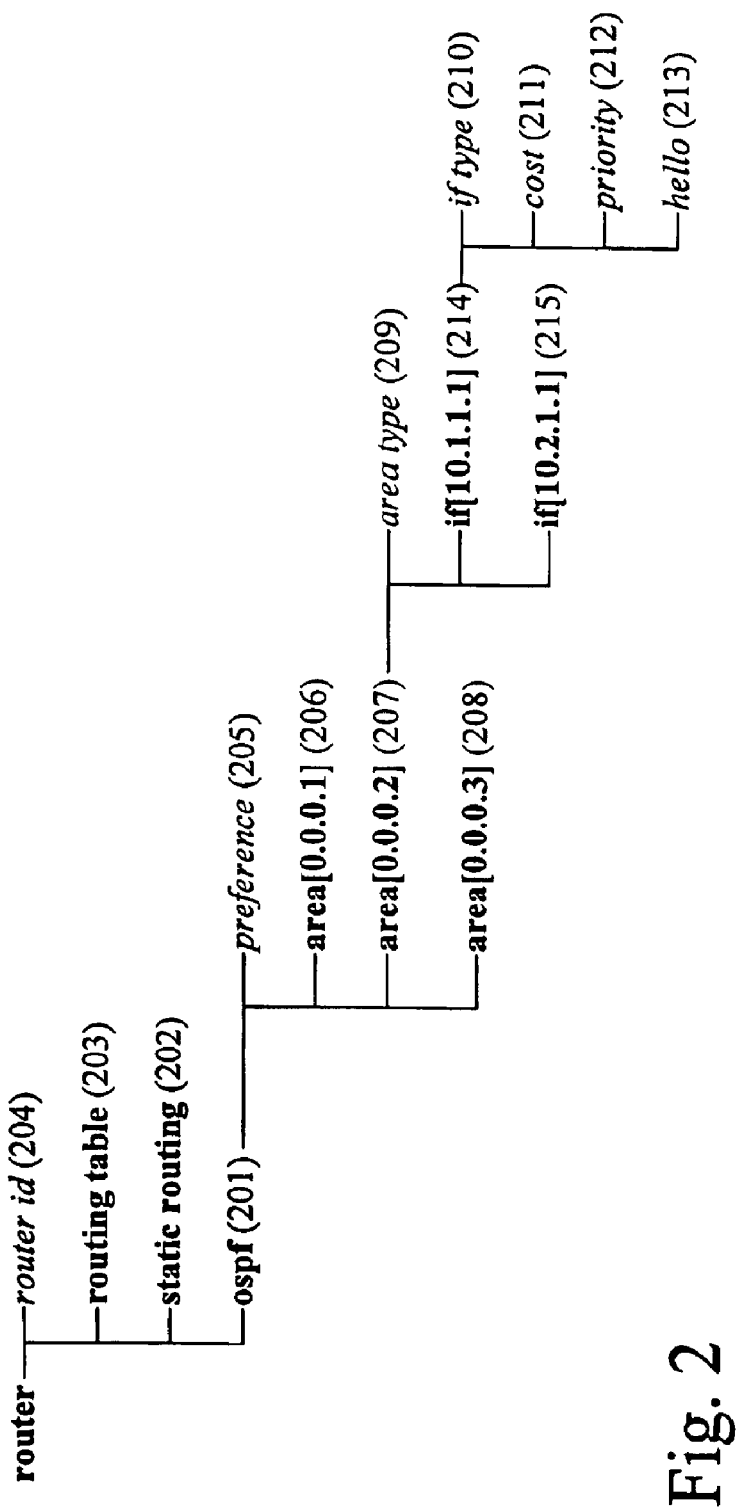
FIG. 2 is a diagram illustrating a hierarchical arrangement of router attributes.

FIG. 2 is a diagram illustrating a hierarchical arrangement of router attributes. The component tree shown in FIG. 2 includes two types of elements: attributes, which are shown in italic text, and components, shown in bold text. A component describes an IP routing feature. Components may be nested within each other. As shown in FIG. 2, for example, the component "ospf" 201 includes sub-components 206, 207, and 208, as well as the "preference" attribute 205. Sub-component 207 includes additional sub-components 214 and 215, as well as the "area type" attribute 209. Sub component 214 includes the attributes "if type" 210, "cost" 211, "priority" 212, and "hello" 213.

An attribute corresponds to a "leaf" of the component tree 200. That is, each attribute is associated with a value, but does not reference any sub-components or sub-values. The "router id" attribute 204, for example, stores an identification code unique to the router.

The ospf component 201 encapsulates all features of the router relating to the OSPF protocol. Each component and attribute below component 201 in component tree 200 in some way relates to the OSPF protocol. The components and attributes shown in component tree 200 will now each be discussed in more detail.

The highest level of component tree 200, in addition to "ospf" component 201, includes the components "static routing" 202, "routing table" 203, and the attribute "router id" 204. The static routing component 202 references an alternative routing source to the OSPF protocol. In general, static routing is the simplest form of a "routing protocol", in which the administrator tells the router how to route data traffic to a pre-specified network address. Dynamic routing protocols, on the other hand, such as OSPF, enable routers to share routing information and to learn dynamically the routes available to them. There are many well known dynamic routing protocols in addition to OSPF that would typically be incorporated into a router. For simplicity, however, only the routing protocols corresponding to the ospf component 201 and the static routes component 202 are shown in FIG. 2.

Routing table component 203 relates to options associated with the router's routing table. A routing table is a table in which the router stores a list of destination networks that the router is aware of, along with information about each destination network, such as the next node's address and the path length to the destination. Preference attribute 205 indicates which protocol the router is to use if the routing table indicates that a particular destination address was found by more than one protocol.

For simplicity, the sub-components and attributes of routing table component 203 and static routing component 202 are not shown in FIG. 2.

In the OSPF protocol, by dividing a network into areas, such as those shown in FIG. 1, even extremely large networks can be managed with a reasonable amount of computing resources. Area components, such as area component 207, further include an "area type" attribute 209 and one or more "if" (interface) components 214 and 215. The interface component identifies the local network included in the area. Area type attribute 209 indicates how the routing information is generated and distributed for the area. For example, a "stub" area type usually has one exit point and it does not accept the routing information outside of the area. In contrast, an area type attribute having the value "transit" indicates that the associated area connects to more than one other area, and may be used as a temporary hop for packets destined for other sub-networks.

As illustrated in FIG. 2, interface component 214 is defined by four attributes: "if type" attribute 210, "cost" attribute 211, "prority" attribute 212, and "hello" attribute 213. These attributes collectively help to define the OSPF behavior of the interface component 214. The "if type" attribute 220 relates to the physical network connection used by the interface, and may have values indicating networks such as a broadcast network (e.g., Ethernet) or a non-broadcast network (e.g., ATM or FrameRelay). "Cost" attribute 221 describes the cost to transmit a packet to the interface. "Priority" attribute 212 indicates the priority of the OSPF designated router election for the local network. "Hello" attribute 213 specifies how often the router should contact the neighbor nodes in order to maintain the live relationship.

As described above, components such as the "area" component 206–208 represent router protocol functionality in component tree 200. Area components 206–208, for example, contain information representing the OSPF functionality relating to dividing a network into sub-networks or "areas." Within each area component 206–208 are additional sub-components or attributes further defining their area component.

Figure 3:
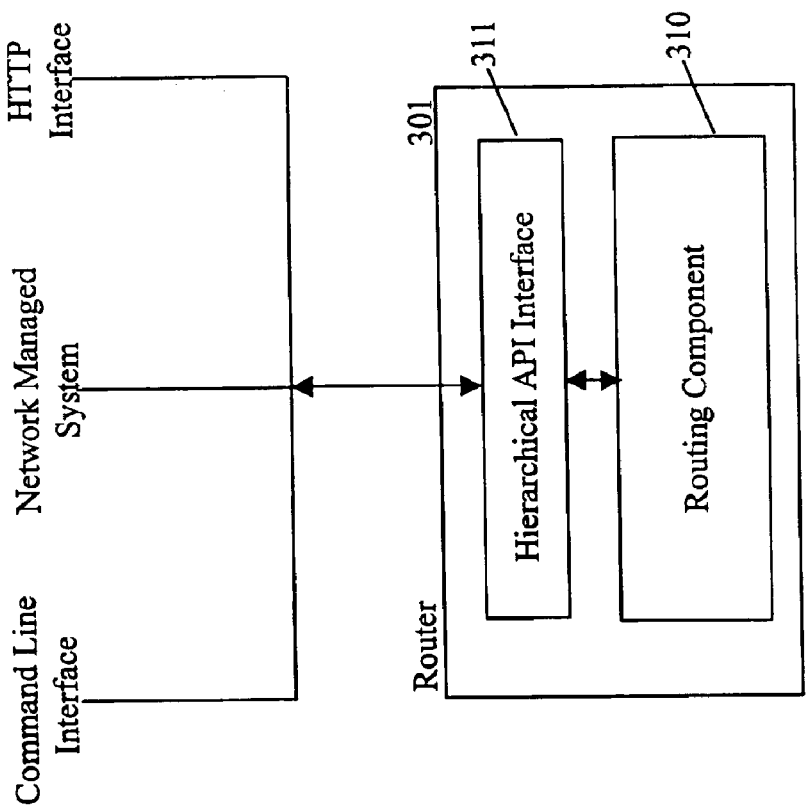
FIG. 3 is a functional block diagram illustrating a router having a hierarchical interface for modifying features of the router.

FIG. 3 is a block diagram illustrating a router having a hierarchical interface for modifying its features. Router 301 is illustratively shown as including a main router component 310 and hierarchical API (Application Programming Interface) 311. Main router component 310 includes the components found in a conventional router, such as a processor, a real-time operating system, and programs and hardware that implement the routing and switching functions.

Configurable features in a conventional router are organized as a "flat" interface that provides little context or feature interdependency information to the user. Router 301, in contrast, includes a hierarchical API interface component 311, which is a program that implements a hierarchical arrangement of the router features such as that shown in component tree 200. API interface 311 may be stored in computer memory of router 310 and executed by a processor in router 310.

API interface 311 presents the features of the router 301 in hierarchical component tree 200 to the user. API interface 311 may allow a user to interact with it through a number of mechanisms. For example, as shown in FIG. 3, users may interact with component 311 via a traditional command-line interface, through a graphical network management system interface, or through a Web browser using the well known HTTP protocol.

An exemplary set of command-line interface commands for modifying and viewing component tree 200 will next be described in more detail with reference to FIG. 4, which is a diagram illustrating command-line component navigation and command usage. The commands shown in FIG. 4 are described with reference to component tree 200.

API interface 311 prompts the user with the prompt "/router>", which informs the user that the current position is "router" (the highest level in component tree 200). The user enters the first command "add" ospf, (line 401), which instructs interface component 311 to create the sub-component ospf. The ospf component, when added, may include a number of default sub-components and attribute values, such as the sub-components and attributes shown under ospf in FIG. 2. The user then changes the current active position in component tree 200 to the newly created ospf component. (Line 402). The user employs the "set" command to set the preference attribute 205 to the value 50. (Line 403). The user may add sub-components to the ospf component, such as an area sub-component and an interface sub-component. (Lines 404 and 405). Finally, using the "display" command, the user displays the component tree under the ospf component. (Lines 406).

Commands other than the "set," "add," and "display" may be implemented by API interface 311. For example, a "delete" command may be used to delete components and a "get" command may be used to retrieve the value of an attribute.

Table 1, below, illustrates a tabular representation of the portion of component tree 200 displayed by the user using the "display" command at line 406.

TABLE I

| Area | Area Type | If | if type | cost | Priority | hello |
|---|---|---|---|---|---|---|
| 0.0.0.1 | stub | 11.0.0.1 | bcast (broadcast) | 2 | 10 | 10 |
| 0.0.0.2 | nssa | 10.1.1.1 | bcast | 1 | 20 | 10 |
|  |  | 10.0.1.1 | p2p (point-to-point) | 5 | 1 | 10 |
| 0.0.0.3 | normal | 12.1.2.3 | bcast | 2 | 5 | 10 |
|  |  | 12.3.0.1 | nbma (non-broadcast) | 3 | 10 | 10 |
|  |  | 12.5.3.1 | bcast | 1 | 20 | 10 |

Although the specific example just discussed presented a command-line implementation of interface component 311, as was previously mentioned, the interface could also be presented to the user as a more graphical interface.

The C++ programming language is one computer language that may be used to implement component tree 200. In particular, the object oriented nature of C++ lends itself well to the framework of the hierarchical component tree 200. For example, two classes may be defined in C++: "component" and "attribute." The class "component" defines the methods "add" and "delete"; while the class "attribute" defines the methods "set" and "get." New components or attributes may easily be added by further defining sub-classes of "component" class or "attribute" class, respectively.

Although router 301 was described as a dedicated hardware router, one of ordinary skill in the art will recognize that component interface 311 and component tree 200 could also be implemented on a general purpose computer.

As described herein, a hierarchical interface component tree reorganizes the traditional flat feature presentation of traditional routers into a hierarchical feature presentation. In particular, the features are organized as functional components that include sub-components and attributes. This arrangement tends to be more intuitive and is easily navigable by applications and the user. Further, because the interdependencies of the attributes are localized and clearly and visually displayed to the user, the user may more quickly understand the ramifications of changing a particular attribute of the router.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed is:

1. A router comprising:
   a routing component that implements IP routing protocols for data processed by the router, wherein a workstation functions as the router via the IP routing protocols; and
   an interface component for a user to view and modify dynamic routing protocol features of the router in real-time, wherein the router utilizes a real-time operating system, the interface component displaying the features of the router to the user as a hierarchical tree having attributes that store values relating to the IP routing protocols and components that represent functionality of the IP routing protocols, the components containing one or more sub-components or attributes, the attributes being modifiable within a single initialization of the router, one of the attributes indicating a priority of a dynamic routing protocol designated router election for a local network and the hierarchical tree displaying the attributes, the components, and the sub-components to the user.

2. The router of claim 1, wherein the interface component is accessible by a user through a command-line interface.

3. The router of claim 1, wherein the interface component is accessible by a user through a graphical interface.

4. A method comprising:
   implementing IP routing protocols for data processed by a router, wherein a workstation functions as the router via the IP routing protocols;
   organizing features relating to routing protocols of the router into a hierarchically formatted component tree, the features including attributes that store values relating to the IP routing protocols and components that represent functionality of the IP routing protocols;
   displaying a portion of the hierarchically formatted component tree to a user in response to a first command from the user, wherein the hierarchically formatted component tree displays the attributes, the components, and sub-components of the components;

modifying the component tree in response to a second command from the user, wherein the attributes are modifiable within a single initialization of the router; and updating, in real-time, features of the router relating to the routing protocol that were changed by the user when modifying the component tree, wherein the router utilizes a real-time operating system and one of the attributes indicates a priority of a dynamic routing protocol designated router election for a local network.

5. The method of claim 4, wherein the hierarchical component tree includes attributes that store values relating to the routing protocols and components that represent functionality of the routing protocols, the components containing one or more sub-components or attributes.

6. The method of claim 4, wherein the first command is a display command.

7. The method of claim 4, wherein the second command is a set preference command.

8. The method of claim 4, wherein the user inputs the first and second commands via a command-line interface.

9. The method of claim 4, wherein the user inputs the first and second commands via a graphical interface.

10. A computer readable medium containing instructions for execution by a processor, the instructions, when executed:

implementing IP routing protocols for data processed by a router, wherein a workstation functions as the router via the IP routing protocols;

organizing features relating to routing protocols of the router into a hierarchically formatted component tree, the features including attributes that store values relating to the IP routing protocols and components that represent functionality of the IP routing protocols;

displaying a portion of the hierarchically formatted component tree to a user in response to a first command from the user, wherein the hierarchically formatted component tree displays the attributes, the components, and sub-components of the components;

modifying the component tree in response to a second command from the user, wherein the attributes are modifiable within a single initialization of the router; and updating, in real-time, features of the router relating to the routing protocol that were changed by the user when modifying the component tree, wherein the router utilizes a real-time operating system and one of the attributes indicates a priority of a dynamic routing protocol designated router election for a local network.

11. The computer readable medium of claim 10, wherein the hierarchical component tree includes attributes that store values relating to the routing protocols and components that represent functionality of the routing protocols, the components containing one or more subcomponents or attributes.

12. The computer readable medium of claim 10, wherein the first command is a display command.

13. The computer readable medium of claim 10, wherein the second command is a set preference command.

14. The computer readable medium of claim 10, wherein the user inputs: the first and second commands via a command-line interface.

15. The computer readable medium of claim 10, wherein the user inputs the first and second commands via a graphical interface.

16. The router of claim 1, wherein one of the attributes relates to a physical connection used by the interface component, and has values indicating networks.

17. The router of claim 1, wherein one of the attributes describes a cost to transmit a packet to the interface component.

18. The method of claim 4, wherein one of the attributes relates to a physical connection used by an interface component of the router, and has values indicating networks.

19. The method of claim 4, wherein one of the attributes describes a cost to transmit a packet to an interface component of the router.

20. The computer readable medium of claim 10, wherein one of the attributes relates to a physical connection used by an interface component of the router, and has values indicating networks.

21. The computer readable medium of claim 10, wherein one of the attributes describes a cost to transmit a packet to an interface component of the router.

22. A router, comprising:

a routing component that implements IP routing protocols for data processed by the router, wherein a workstation functions as the router via the IP routing protocols; and an interface component for a user to view and modify features of the router in real-time, wherein the router utilizes a real-time operating system, the interface component displaying the features of the router to the user as a hierarchical tree having attributes that store values relating to the IP protocols and components that represent functionality of the IP protocols, the components containing one or more sub-components, the attributes being modifiable within a single initialization of the router, one of the attributes specifies how often the router should contact neighbor nodes in order to maintain a live connection, and the hierarchical tree displaying the attributes, the components, and the sub-components to the user.

23. The router of claim 22, wherein one of the attributes relates to a physical connection used by an interface component of the router, and has values indicating networks.

24. The router of claim 22, wherein one of the attributes describes a cost to transmit a packet to an interface component of the router.

25. A method comprising:

implementing IP routing protocols for data processed by a router, wherein a workstation functions as the router via the IP routing protocols;

organizing features relating to routing protocols of the router into a hierarchically formatted component tree, the features including attributes that store values relating to the IP routing protocols and components that represent functionality of the IP routing protocols;

displaying a portion of the hierarchically formatted component tree to a user in response to a first command from the user, wherein the hierarchically formatted component tree displays the attributes, the components, and sub-components of the components;

modifying the component tree in response to a second command from the user, the attributes being modifiable within a single initialization of the router; and updating, in real-time, features of the router relating to the routing protocol that were changed by the user when modifying the component tree, wherein the router utilizes a real-time operating system and one of the attributes specifies how often the router should contact neighbor nodes in order to maintain a live connection.

26. The method of claim 25, wherein one of the attributes relates to a physical connection used by an interface component of the router, and has values indicating networks.

27. The method of claim 25, wherein one of the attributes describes a cost to transmit a packet to an interface component of the router.

28. A computer readable medium containing instructions for execution by a processor, the instructions, when executed:

implementing IP routing protocols for data processed by a router, wherein a workstation functions as the router via the IP routing protocols;

organizing features relating to routing protocols of the router into a hierarchically formatted component tree, the features including attributes that store values relating to the IP routing protocols and components that represent functionality of the IP routing protocols;

displaying a portion of the hierarchically formatted component tree to a user in response to a first command from the user, wherein the hierarchically formatted component tree displays the attributes, the components, and sub-components of the components;

modifying the component tree in response to a second command from the user, wherein the attributes are modifiable within a single initialization of the router; and updating, in real-time, features of the router relating to the routing protocol that were changed by the user when modifying the component tree, wherein the router utilizes a real-time operating system and one of the attributes specifies how often the router should contact neighbor nodes in order to maintain a live connection.

29. The computer readable medium of claim 28, wherein one of the attributes relates to a physical connection used by an interface component of the router, and has values indicating networks.

30. The computer readable medium of claim 28, wherein one of the attributes describes a cost to transmit a packet to an interface component of the router.

* * * * *